United States Patent [19]

Fast

[11] 3,990,105
[45] Nov. 2, 1976

[54] AUDIO-VISUAL CONVERTOR
[76] Inventor: Robert E. Fast, R.R. 1, Box 59, Haviland, Ohio 45851
[22] Filed: Feb. 19, 1974
[21] Appl. No.: 443,494

[52] U.S. Cl. .................................................. 358/82
[51] Int. Cl.² ........................................... H04N 9/02
[58] Field of Search ................ 358/82; 178/5.6, 6.8; 179/1 SP; 84/464

[56] References Cited
UNITED STATES PATENTS

| 2,804,500 | 8/1957 | Giacoletto | 179/1 SP |
| 3,587,298 | 6/1971 | Jacobs | 358/82 X |
| 3,604,852 | 9/1971 | Weintraub | 358/82 X |
| 3,622,914 | 11/1971 | Chung | 325/145 X |
| 3,647,942 | 3/1972 | Siegel | 358/82 |
| 3,723,652 | 3/1973 | Alles et al. | 358/82 X |
| 3,742,125 | 6/1973 | Siegel | 178/6.8 X |
| 3,900,886 | 8/1975 | Coyle et al. | 358/82 |

Primary Examiner—Robert L. Griffin
Assistant Examiner—Mitchell Saffian
Attorney, Agent, or Firm—Gust, Irish, Jeffers & Rickert

[57] ABSTRACT

Apparatus for generating a display upon the screen of a television receiver which display changes with changes in the audio frequency signal is disclosed comprising a carrier signal source, a color subcarrier signal source, a horizontal synchronizing signal source, and means for varying the phase of the color subcarrier signal in accordance with audio frequency signals only in the absence of horizontal synchronizing signals. Flashing horizontal color stripes are displayed on the screen of a color television receiver in rhythm with the sounds coming from an audio source with the pitch of the sound determining the number of sets of color stripes and the loudness of the sound determining the number of hues within each stripe set.

7 Claims, 3 Drawing Figures

AUDIO-VISUAL CONVERTOR

BACKGROUND OF THE INVENTION

The present invention relates to a system for converting audio signals to a visual display and more particularly to a television sound display system. Systems for displaying interpretations of audio signals are known and, for example, represented by U.S. Pat. Nos. 2,804,500 to Giacoletto and 3,604,852 to Weintraub. An improvement over these two systems wherein a standard color television receiver and audio source are employed without modification is illustrated in U.S. Pat. No. 3,723,652 to Alles et al. All three of these systems perform a frequency separation on an audio signal employing some type of filtering scheme. The Weintraub system controls both intensity and beam deflection in a cathode ray tube as a function of a sound spectral content while the Alles et al system employs an internal pattern generator in conjunction with the audio signals. Giacoletto provides different horizontal scanning rates depending upon the type of color input to a color cathode ray tube. The prior art systems lack simplicity and may require internal connections within the television receiver. Color bar generators as color television test equipment are, of course, known but do not provide a color bar display in accordance with an audio signal.

It is accordingly one object of the present invention to provide an audio-visual convertor characterized by its economy of manufacture.

Another object of the present invention is to provide apparatus for generating a display upon the screen of a television receiver requiring no internal connections to or modifications of the existing television receiver circuitry.

SUMMARY OF THE INVENTION

The foregoing as well as numerous other objects and advantages of the present invention are achieved by providing a carrier signal having a frequency within the range of radio frequency signals receivable by a television receiver, means responsive to an audio frequency signal for modifying the carrier signal in accordance with changes in the audio frequency signal, and means coupling the modified carrier signal to a television receiver to thereby display on the receiver screen a pattern which changes as the audio frequency signal changes. In the preferred form, the present invention is to be used in conjunction with a color television receiver and the means for modifying includes a color subcarrier oscillator and means for varying the phase of the subcarrier signal in accordance with changes in the amplitude of the audio frequency signal. The carrier signal is then modulated with the phase modulated subcarrier signal. The apparatus of the present invention in a preferred embodiment employs a color subcarrier oscillator which is crystal controlled and a voltage variable capacitor coupled to the audio frequency signal for varying the phase of the color subcarrier signal and also may employ a passive circuit coupled to the audio frequency source for providing a voltage regulated direct current source of power from the audio frequency signal to energize the display generating apparatus.

It is therefore a further object of the present invention to provide an audio-visual convertor which derives its power source from the audio input signal.

A general object of the present invention is to provide a pleasing combination of sound and picture.

Another general object of the present invention is to provide a psychedelic television system.

The subject matter which I regard as my invention is particularly pointed out and distinctly claimed in the concluding portion of this specification. My invention itself, however, together with further objects and advantages thereof may best be understood by reference to the following description taken in conjunction with the accompanying drawing.

DESCRIPTION OF THE PREFERRED EMBODIMENT

Figure 1:
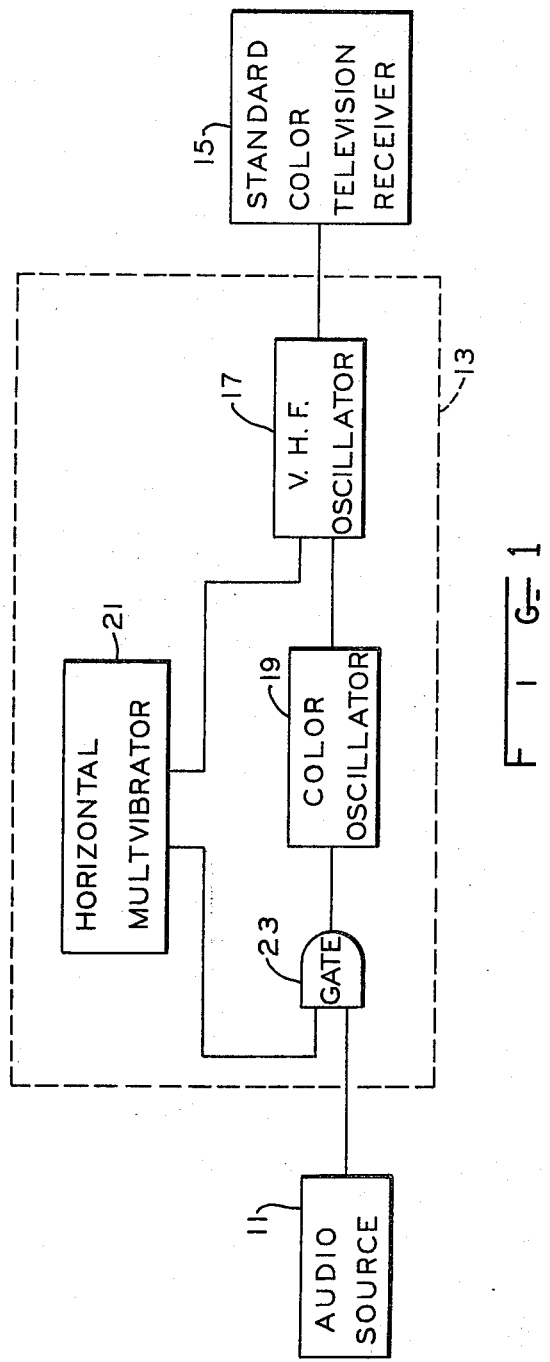
FIG. 1 is a general block diagram of the present invention.

Referring now to the drawing more in greater detail, FIG. 1 illustrates an audio source 11 which provides an input to the audio-visual convertor 13 the output of which is coupled to the antenna terminals of a standard color television receiver 15. The convertor 13 includes a carrier signal oscillator 17 for providing a carrier signal having a frequency within the range of radio frequency signals receivable by the television receiver and in one preferred embodiment provided a channel two carrier. A crystal controlled color oscillator 19 provides a color subcarrier signal for modulating the signal of oscillator 17. Horizontal synchronizing signals are provided by the free running multivibrator 21 to be superimposed on the carrier signal and to be provided to the gate 23 which functions to temporarily disable phase changes from the color oscillator 19 by preventing passage of the audio signals into the color oscillator.

Figure 2:
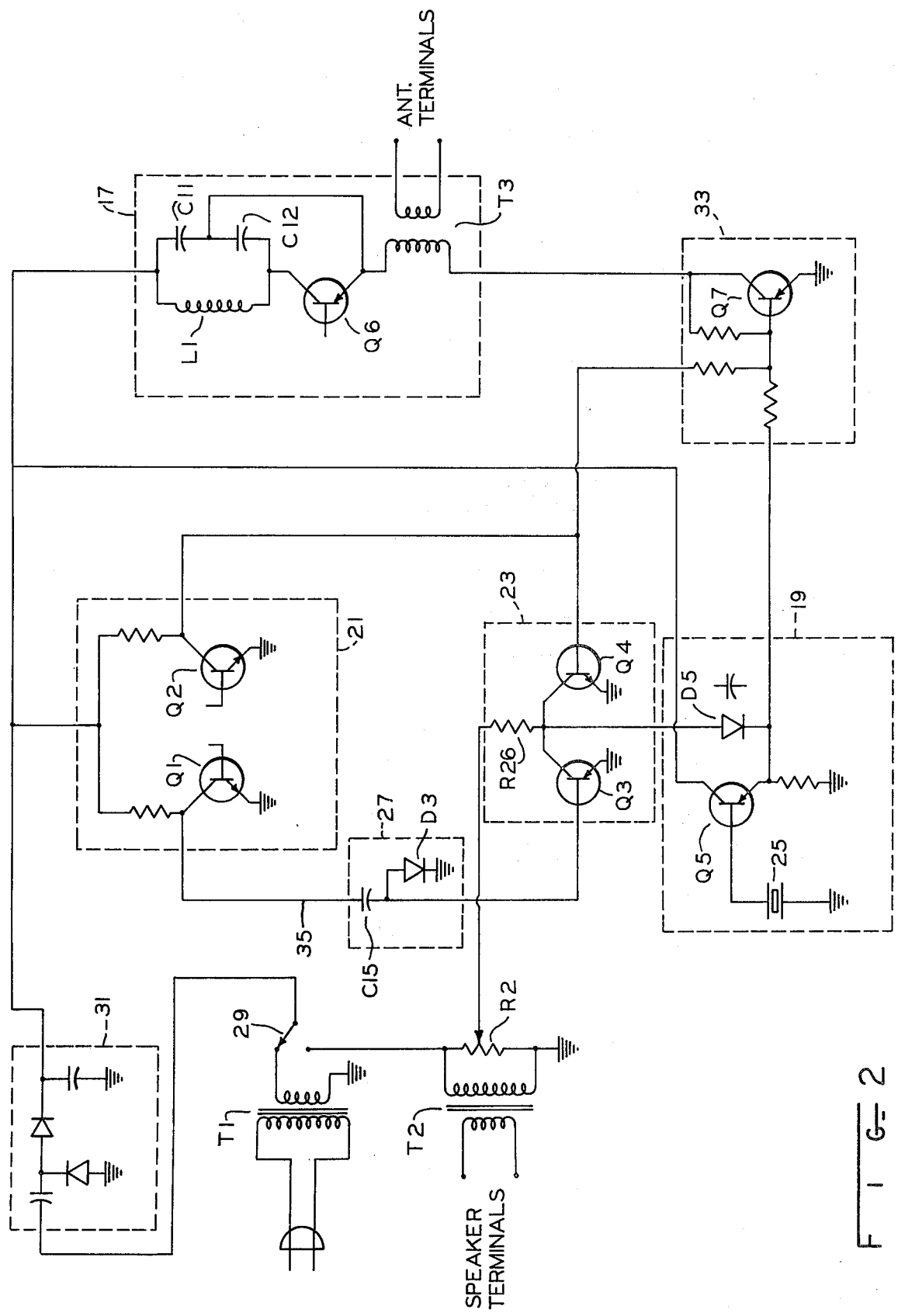
FIG. 2 is a more detailed block diagram of the convertor of FIG. 1 illustrating the salient circuit components in schematic form.

In FIG. 2 the several components of the convertor 13 of FIG. 1 bear like reference numerals. The color oscillator 19 includes a frequency control crystal 25 for maintaining the frequency of the color oscillator at about 3.58 megahertz and a voltage variable capacitor D5 changes in the capacity of which shift the phase of the color oscillator signal. Voltage variable capacitor or varactor D5 receives its control signals from the audio frequency signal source unless the gate 23 grounds those signals upon the occurrence of a synchronizing pulse. The gate 23 comprises a pair of transistors of unlike type with the transistor Q3 receiving its control synchronizing signals by way of a DC clamping circuit 27. The convertor may obtain its energy by way of a step down transformer T1 or if the amplitude of the audio signals is sufficiently great, switch 29 may be shifted from the position shown so that the audio signals are supplied to a half wave voltage doubler 31 which is a passive circuit and which may provide a direct current source of power for the display generating apparatus. The detailed functioning of the present invention may be further understood referring to the detailed schematic diagram of FIG. 3.

Figure 3:
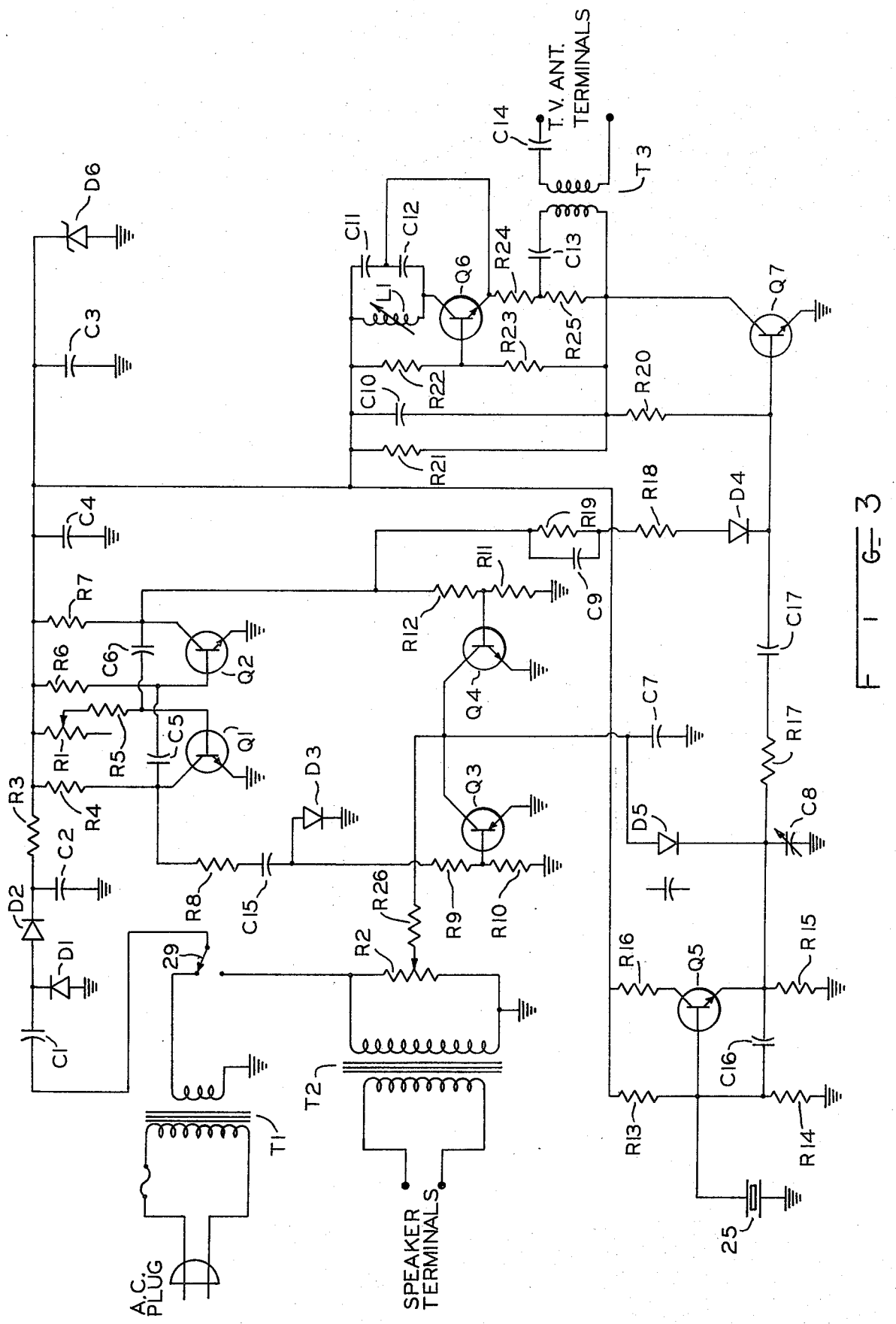
FIG. 3 is a detailed schematic diagram of the converter of the present invention.

In FIG. 3, capacitors C1 and C2 and diodes D1 and D2 form a half wave voltage doubler 31. Zener diode D6 regulates the voltage from the doubler to plus 10 volts which is the direct current source of power for the display generating apparatus. Transistors Q1 and Q2 with capacitors C5 and C6 and the resistors R4, R5, R6, R7 and R1 form a free running multivibrator which delivers pulses at the horizontal scanning frequency of 15750 cycles per second typically used in a television receiver. The horizontal synchronizing pulses are supplied to the amplitude modulator 33 built around transistor Q7 and also to the gate 23 for blocking the audio signals during horizontal retrace of the television receiver. Capacitor C15 and diode D3 form a DC clamping circuit which changes the negative going pulses on line 35 from a plus 10 volt reference level at the collector of transistor Q1 to a zero volt reference level at the base of transistor Q3. The transistors Q3 and Q4 along with resistor R26 form a gate which will short the audio signal voltage from resistor R2 to ground when pulses are delivered from the multivibrator 21. Q4 will conduct if the audio signal voltage is positive and Q3 will conduct if the audio signal voltage is negative.

The voltage variable capacitor D5 was biased in the reverse direction at 4 volts as a quiescent operating point and the same capacitance change occurs between zero and four volts as occurs between 4 and 20 volts and while this undesirable nonlinear characteristic of the voltage variable capacitor may be obviated by employing more expensive components, in one preferred embodiment this nonlinearity was obviated by selecting the transistor Q3 so that its reverse leakage current attenuates the positive half cycles of the audio signal voltage more than the transistor Q4 attenuates the negative half cycles of the audio signal voltage.

The color subcarrier oscillator 19 includes a 3.58 megahertz crystal 25, resistors R13, R14 and R15, capacitors C8 and C16 along with the previously mentioned transistor Q5 and voltage variable capacitor D5. D5 will change the phase of the oscillator 19 at a rate directly proportional to the frequency of the audio signal voltage with the amount of phase change being proportional to the magnitude of the audio signal voltage. The phase difference between the 3.58 megahertz oscillator 19 and the 3.58 megahertz oscillator in the color television receiver will determine the hue seen on the color television receiver screen. It is necessary that there be no phase change during horizontal retrace of the television receiver because this is when the 3.58 megahertz oscillator in the receiver is synchronized to the 3.58 megahertz signal from the convertor 13. To accomplish this, the audio signal voltage is kept from the anode of D5 when pulses from the multivibrator 21 are present. The start of a pulse from the multivibrator 21 will start the horizontal retrace in the television receiver. D5 will also affect the amplitude of the 3.58 megahertz oscillator output somewhat with changes in the amplitude of the audio signal thus providing a contrast change in rhythm with the amplitude of the audio signal voltage in the event that the unit is connected to a standard black and white television receiver. Capacitor C7 acts as an effective short circuit to the 3.58 megahertz that would otherwise be present at the anode of D5. Resistor R17 limits the amount of signal applied to the base of transistor Q7. Capacitor C17 provides direct current isolation between transistor Q7 and the color oscillator 19. Resistors R18 and R19 limit the amplitude of the positive going pulse from the multivibrator 21 which is applied to the base of transistor Q7. Capacitor C9 functions to increase the sharpness of that pulse and diode D4 provides isolation between the multivibrator 21 and the amplitude modulator 33 when no pulse is present. Transistor Q7 of the amplitude modulator 33 mixes and amplifies the 3.58 megahertz signal from the color oscillator 19 and the pulses from the multivibrator 21. Such pulses should have a fast rise time to properly synchronize the television receiver. The output of transistor Q7 functions to vary the voltage across the VHF oscillator 17 and thus modulate the VHF oscillator output signal. The VHF oscillator 17 comprises transistor Q6, capacitor C11 and C12, inductance L1 and resistors R22, R23 and R24 in the form of a Colpitts oscillator. Capacitor C13 provides direct current isolation for the transformer T3 and capacitor C14 functions to protect the transformer T3 in the event that the television lead terminals are inadvertently connected to the speaker terminals or other audio source.

In operation, the primary winding of the step up transformer T2 is coupled to speaker terminals or another audio source and the series combination of the secondary winding of transformer T3 and capacitor C14 is coupled, for example, by a standard three hundred ohm television antenna lead wire to the television antenna terminals of the television receiver. With the power switch 29 in the "speaker" position and if a moderate amount of power is being delivered by the speaker circuitry to the unit, the unit will operate without being separately coupled to an alternating current source. A color display will be seen, for example, on channel 2 and if the display is faint the power switch 29 should be changed to the position illustrated and the unit coupled to an alternating current supply by way of transformer T1. If color bars are seen on the screen of the television receiver with the color control potentiometer R2 set in its lowermost illustrated position where no voltage is applied to the gate 23, the oscillator 19 is not operating at the correct frequency and variable capacitor C8 should be adjusted to correct the frequency so that the screen is entirely one hue. If black horizontal bars are seen on the receiver screen, the horizontal hold control R1 should be adjusted to eliminate those bars. The color control potentiometer R2 may then be adjusted and the color, tint, brightness and contrast controls on the television receiver set for the most preferred effects.

Because the vertical scanning rate of a television receiver is 60 hertz, the number of multiples of 60 hertz that the audio signal frequency is will be the number of sets of horizontal color stripes seen on a color television receiver screen.

The number of hues in each set of color stripes will be dependent on the magnitude of the audio signal voltage and the setting of the color control potentiometer R2.

Thus, while the present invention has been described with respect to a preferred embodiment, numerous modifications will suggest themselves to those of ordinary skill in the art and accordingly the scope of the present invention is to be measured only by that of the appended claims.

I claim:

1. In combination with a standard color television receiver and a source of audio frequency signals, apparatus for generating a display upon the screen of the receiver which display changes with changes in the audio frequency signal comprising:

means for providing a carrier signal having a frequency within the range of radio frequency signals receivable by the television receiver;

means responsive to the audio frequency source for modifying the carrier signal in accordance with changes in the audio frequency signal and including a color subcarrier oscillator for providing a subcarrier signal, means for varying the phase of the subcarrier signal in accordance with changes in the amplitude of the audio frequency signal, and means for modulating the carrier signal with the subcarrier signal;

means for providing horizontal synchronizing signals to the carrier providing means to be supplied to the color television receiver for the synchronization thereof;

means for coupling the modified carrier signal to a television receiver to thereby display on the receiver screen a pattern which changes as the audio frequency signal changes; and means for temporarily disabling the means for varying during the occurrence of the horizontal synchronizing signal.

2. The apparatus of claim 1 wherein the means for providing horizontal synchronizing signals comprises a free running multivibrator and the means for temporarily disabling comprises gate means for preventing the audio frequency signals from reaching the color subcarrier phase varying means during the occurrence of the horizontal synchronizing signals.

3. The apparatus of claim 1 wherein the rate at which the phase of the subcarrier signal is varied is the same as the frequency of the audio frequency signal whereby there is displayed a number of sets of color stripes with the total number of sets of stripes being proportional to the frequency of the audio frequency signal and the number of hues within each color stripe set being determined by the amplitude of the audio frequency signal.

4. The apparatus of claimd 1 wherein the color subcarrier oscillator is crystal controlled.

5. The apparatus of claim 1 wherein the means for varying comprises a voltage variable capacitor and means coupling the audio frequency signal to the voltage variable capacitor to vary the capacitance thereof in accordance with variations in the audio frequency signal.

6. An audio-visual converter responsive to audio input signals for providing television output signals comprising:

an oscillator for providing a carrier signal in a frequency range receivable by a television receiver;

a color subcarrier oscillator circuit for providing color subcarrier signals;

means for providing horizontal synchronizing signals;

means responsive to the audio input signals for varying the phase of the color subcarrier oscillator output;

means for mixing the carrier signal, color subcarrier signals, and horizontal synchronizing signals to provide the television output signals; and means for preventing phase variation of the color subcarrier oscillator output during the occurrence of horizontal synchronizing signals.

7. In combination with a standard television receiver and a source of audio frequency signals, apparatus for generating a display upon the screen of the receiver which display changes with changes in the audio frequency signal comprising:

means for providing a carrier signal having a frequency within the range of radio frequency signals receivable by the television receiver;

means responsive to the audio frequency source for modifying the carrier signal in accordance with changes in the audio frequency signal;

means for providing synchronizing signals to the carrier providing means;

means for coupling the modified carrier signal to a television receiver to thereby display on the receiver screen a pattern which changes as the audio frequency signal changes; and a passive circuit coupled to the audio frequency source for providing a voltage regulated direct current source of power from the audio frequency signals to energize the display generating apparatus.

* * * * *